Jan. 27, 1970   R. W. PFEIFFER   3,492,221
APPARATUS AND METHOD FOR CONVERSION OF HYDROCARBONS
Filed April 5, 1968   2 Sheets-Sheet 1

INVENTOR
ROBERT W. PFEIFFER
BY
ATTORNEY

AGENT

Jan. 27, 1970  R. W. PFEIFFER  3,492,221
APPARATUS AND METHOD FOR CONVERSION OF HYDROCARBONS
Filed April 5, 1968  2 Sheets-Sheet 2

INVENTOR
ROBERT W. PFEIFFER
BY
ATTORNEY

AGENT

United States Patent Office 3,492,221
Patented Jan. 27, 1970

1

3,492,221
APPARATUS AND METHOD FOR CONVERSION
OF HYDROCARBONS
Robert W. Pfeiffer, Bronxville, N.Y., assignor to Pullman Incorporated, Chicago, Ill., a corporation of Delaware
Filed Apr. 5, 1968, Ser. No. 719,052
Int. Cl. C10g *13/14;* B01j *9/06*
U.S. Cl. 208—164                        29 Claims

ABSTRACT OF THE DISCLOSURE

An apparatus and method for effecting fluid catalytic cracking of hydrocarbons to products boiling in the gasoline range including a seal well containing a pressure-developing column of regenerated catalyst for transfer of the catalyst through a reaction zone, the seal well being in open pressure communication with the outlet of the reaction zone.

---

This invention relates to an apparatus and a method for conversion of hydrocarbons and more specifically to an apparatus and method for fluid catalytic cracking of relatively heavy hydrocarbons to high quality gasoline product.

In recent years, commercial catalytic cracking catalysts have been developed which are highly active and also exhibit superior selectivity towards the formation of desirable products such as gasoline at the expense of coke and light ends production. Examples of such catalysts are those of the types commonly called "high alumina" and "molecular sieve" catalysts. It has been found that maximum benefit is derived from these catalysts by reducing the time the catalyst is in contact with the hydrocarbons undergoing cracking in the reaction zone. For this reason, it is preferred to carry out the catalytic cracking operations employing so-called dilute or disperse phase cracking techniques, i.e., the catalyst is contacted with a hydrocarbon feed stream moving through the reaction zone at sufficiently high superficial velocities that the catalyst is carried along in said stream as a dilute suspension.

In general, catalytic cracking of relatively high boiling hydrocarbons to form substantial quantities of materials boiling in the gasoline range is carried out in the following process sequence: hot regenerated catalyst is contacted with preheated hydrocarbon feed in a reaction zone under conditions suitable for cracking, the cracked hydrocarbon vapors are disengaged from the spent catalyst, which is subsequently fed to a stripping zone where it is contacted with a gasiform stripping agent, whereby volatile hydrocarbon material is stripped from the catalyst. The stripped catalyst is then transferred to a regeneration zone where it is regenerated by burning carbonaceous deposits from the catalyst using an oxygen-containing gas such as air, after which the regenerated catalyst is transferred to the reaction zone for reuse. The hydrocarbon material from the reaction zone and the stripping zone is transferred to a recovery system including suitable fractionation equipment for recovery of gaseous products, gasoline and one or more heavier fractions boiling above the gasoline range. The latter fractions may be withdrawn as products of the process or may at least in part be recycled to the reaction zone for further cracking.

It has been found that substantial economies are realized when the regenerator vessel is superimposed in vertical alignment on a vessel containing the reaction zone, the catalyst disengaging zone and the stripping zone. One important advantage of such an arrangement is that

2 the catalyst may be transferred from the regeneration zone into the reaction zone through a straight-line vertical standpipe, and similarly, stripped catalyst can be introduced to the regenerator through a straight-line vertical riser, thereby avoiding the erosion and/or fluidization problems otherwise resulting from the lateral transport of catalyst.

Another important advantage of this arrangement is that the regeneration zone can be operated at a lower pressure than the reaction zone, and consequently the cost of construction of the vessel as well as the cost of compression of the oxygen-containing regeneration gas can be minimized. Moreover, due to relatively higher pressure of the cracked hydrocarbon vapors, the size and cost of the fractionation equipment as well as the compression cost in handling normally gaseous hydrocarbons in the recovery system also are minimized.

There are, however, many problems connected with the design of a dilute phase reaction zone included in the aforementioned apparatus. It is necessary that the vertical standpipe supplying freshly regenerated catalyst from the upper regeneration vessel to the inlet of the reaction zone, usually located in a lower portion of the lower vessel, be rigidly supported by either the upper vessel or by the top section of the lower vessel.

A design rigidly connecting the outlet of said standpipe with the inlet to a dilute phase reaction zone conduit, where the latter is supported by the bottom portion of the lower vessel, cannot be tolerated. This is so, because during startup of such a unit, the considerable downward expansion of the standpipe would result in mechanical failure of the rigid connection between said reaction zone and the standpipe.

For safety reasons, designs including annular reactors directly encompassing the vertical standpipe should be avoided. The high velocity suspension of catalyst and hydrocarbon vapors flowing upwards through such annular reactors would subject the standpipe to erosion. Since such systems are not readily inspected to determine possible failures, and due to inherent positive pressure differentials between the annular reactor and the standpipe, an actual failure could result in the introduction of large amounts of hydrocarbon vapors into the oxygen-containing regeneration zone with dangerous results.

Moreover, since the selectivity of the process is favored by short contact times, it is generally desired that subsequent to the reaction, the catalyst be separated from the hydrocarbons as rapidly as possible to prevent overcracking.

It is therefore an object of this invention to provide an apparatus and method for conversion of hydrocarbons employing short reactor contact times.

Another object of this invention is to provide an apparatus and method for dilute phase catalytic cracking of hydrocarbons where problems due to erosion of the equipment are minimized.

Still another objective is to provide an apparatus and a process for the rapid separation of gaseous or vaporous material from a suspension of solids in said material.

Another object of the invention is to provide an apparatus where problems due to heat expansion are minimized.

Other objects and advantages will become apparent to those skilled in the art from the following description and disclosure.

In accordance with the present invention there is provided an apparatus for the conversion of hydrocarbons which comprises an upper vessel; a lower vessel; at least one structure forming an open seal well within said lower vessel; at least one standpipe in communication with the upper vessel and the open seal well; valve means for controlling flow of solid material through said standpipe into said seal well; at least one confined elongated transfer zone within said lower vessel in open pressure communication with and depending from each of said seal wells; means for introducing hydrocarbon feed into the confined elongated transfer zone; a solids stripping zone; means for introducing solids from the transfer zone into said stripping zone, and means for transferring solids from the solids stripping zone to the upper vessel.

The upper vessel may be of any design suitable for the regeneration of spent catalyst employing fluidized dense bed techniques and should include means for introduction of oxygen-containing gas into a bottom portion of said vessel, and preferably cyclones located in an upper portion of said vessel for the recovery of entrained solids from the regenerator flue gases and return of said solids to the bed of catalyst undergoing regeneration. The lower vessel, containing one or more confined elongated transfer zones, may be provided with means for maintaining a fluidized dense bed of solid material in the bottom portion thereof, said means including inlets for fluidizing gases such as steam, nitrogen or hydrocarbon feed. The lower vessel should preferably be of a sufficient size to permit the installation of cyclones in an upper portion thereof for the purpose of recovering entrained solids from the vapors exiting the lower vessel. The stripping zone or zones can be provided by suitable partitions located within a lower portion of the vessel or as a lesser diameter downward extension of the lower vessel, or as a separate vessel.

Preferably both the upper and the lower vessels are of an essentially cylindrical shape having spherical or semi-spherical heads. The upper vessel may be directly superimposed on the lower vessel providing a so-called "single-head" system, or it can be positioned above the lower vessel such that atmospheric air can circulate between the vessels providing what is commonly known as a "two-head" system. The single-head structure is generally more economical in regard to systems in which the diameter of the regenerator is not more than about 25 feet. Below such diameters, the amount of metal expansion incurred can be reasonably accommodated by using metal thicknesses in the vessel structure which can be fabricated and handled without excessive cost and without incurring unreliable vessel quality which may render the vessel unsuitable. At greater diameters than the above stated, a "two-head" system is preferably used.

In the "single-head" system the support point of a suspended vertical standpipe communicating with the upper and lower vessels is located in the upper portion of the lower vessel, while in the "two-head" system a suspended standpipe may be supported in a lower portion of the upper vessel or may be supported in the upper portion of the lower vessel. In the latter system a seal between the standpipe and the lower vessel is provided, e.g., by a bellows type expansion joint which is required between the upper and lower vessels.

In a "single-head" system it is preferred to provide the section of the standpipe extending from a lower portion of the upper vessel into an upper portion of the lower vessel with an annular space enveloping said section and means for introducing thereto a cooling gas such as low-temperature steam. This arrangement will serve to protect the nozzle located in the common partition through which the standpipe extends, i.e., said nozzle can then be maintained at temperatures considerably lower than that of the upper vessel and that of the solids flowing through the vertical standpipe.

The valve means for control of solid material through the standpipe could be a slide valve in, for instance, the portion of the standpipe located between the upper and the lower vessels in a "two-head" system. Another and more preferred alternative, which can be used in any system, is a plug valve which seats against an annular seat in the lower end of the standpipe, said valve being vertically reciprocable through a bushing in the bottom of the lower vessel. The total differential movement of the standpipe between its support point and the valve seat at its lower extremity, varies the hot and cold positions of the valve seat. The flow of solid material in the standpipe is dependent upon the size of the opening between the reciprocal valve and its seat. This valve is thus controlled in such a manner that its opening will give the desired flow rate regardless of the movements of its seat due to expansion resulting from change in temperature.

The vertical standpipe is advantageously provided with means for introduction of aeration gas at points spaced throughout the length of the standpipe to promote a smooth and steady flow of solids therethrough. The geometric configuration of the open seal well structure enveloping this vertical standpipe is not too important as long as there is provided sufficient space between the walls of the structure and the standpipe to permit a fluidized dense bed of solid material to be maintained in said space; for instance, a horizontal cross-section thereof could be a square, rectangle, ellipse, or of any other suitable shape. However, for ease of construction and maintenance it is preferred that said well structure be of a generally cylindrical shape with its longitudinal axis coinciding with that of the standpipe. The height of the well structure will generally correspond closely to the height of the transfer zone, a minimum prerequisite being, however, that the height of the well be sufficient to maintain the above-mentioned dense fluidized bed of solid material in said well such that it will seal the outlet of the standpipe and also will develop sufficient pressure to enable circulation of solids at design rates through the transfer zone depending from said well.

In "two-head" system designs using a slide valve for controlling the flow of solids in the vertical standpipe, the open seal well structure may be supported at an upper portion thereof by an adjacent portion of the standpipe or alternatively at the lower vessel head. The preferred embodiment of the invention, whether a plug valve or slide valve is employed for said purpose, includes the rigid support of the open seal well structure by a bottom portion of the lower vessel.

The invention is not limited to one specific design of the elongated confined transfer zone which is depending from the seal well, the only requirement being that the length be sufficient to provide adequate contact between the hydrocarbon feed and the solid catalyst to result in the desired conversion of the feed. All designs, however, would preferably include an erosion resistant refractory lining, which serves as the primary protection for the metal structure forming the transfer zone.

In one preferred embodiment of the invention at least one transfer zone at one of its extremes is physically and rigidly connected to the well structure and extends therefrom in an outward and generally upward direction at least in its first portion. In order to minimize the height of the lower vessel, it is advantageous to provide the elongated transfer zone with one or more devices for changing direction of flow. Erosion due to the flow of high-velocity eroding suspensions through the transfer zone will usually be a maximum in these devices, and care should be exercised in their design. It has been found that such erosion can be reduced substantially if the changes of direction of flow are essentially right-angled, e.g., a vertical straight section of the transfer zone is closely followed by a horizontal straight section, and if such sections are connected by appropriately designed devices. One suitable design for such a connection is a so-called "side-out" straight T, i.e., a T used as elbow, entering run. The far end of the run is capped and is thus closed to flow. A more preferred design, however, is comprised of a truncated oblique hollow cone extending from a first section of the transfer conduit, the far end of the cone being its base of larger diameter, a cap covering and closing said larger diameter base and a second section of said transfer conduit extending from an outlet in the oblique conical surface in such a way that the projected axis of the second section of the transfer conduit is intersecting that of the first section at substantially right angles and lying in a plane bisecting the cone in two equal symmetrical volumes. In a preferred embodiment of such a device, there is provided between the base of the cone and the cap an extension such as a hollow cylindrical extension of the same diameter as that of the base. The inlet flow which enters through the smaller-diameter area of the cone exits through the side outlet provided in surface, such side outlet preferably having the same cross-sectional area as the inlet. The oblique cone design has the advantage over the T in that sharp projections, which are subject to erosion, have been removed from the direct line of travel of the solids suspension. In both embodiments, the sudden change in direction of the high-velocity suspension causes solids to collect as a relatively dense suspension within the devices, especially in the respective closed portions thereof (i.e., in the far end of the run of the T, or in the larger-diameter area of the cone or in the extension thereof), and said collected solids serve as a protective cushion on which the suspension impinges. The closed portions of the aforementioned devices can be periodically opened for inspection and maintenance purposes without necessitating dismantling of any other part of the transfer-reaction zone.

In addition, the primary structures forming these devices can advantageously be enclosed within secondary protective structures of suitable designs, e.g., offset cylinders, where the annular space between a device and its corresponding secondary protective structure may be filled with an erosion resistant refractory material. Thus, in case of an actual erosion failure in the primary structure forming the device, the secondary protective structure will continue to maintain the suspension within the transfer zone. Thus plant operations need not be disrupted due to an erosion failure of the primary device, but can be continued for relatively long periods of time before plant shutdown for maintenance becomes necessary. It is to be understood that any other localized area of the transfer zone found to be subject to severe erosion could also be enclosed within secondary protective structures similar to the ones previously described.

It is to be understood that more than one standpipe can be included in the design of the apparatus of this invention, each of these standpipes communicating with a seal well with at least one reaction zone depending therefrom, i.e., the scope of the invention includes designs where two or more transfer zones depend from a common seal well. Such designs are useful in the efficient utilization of the space available in a relatively small lower vessel. However, the preferred means for the conversion of dissimilar hydrocarbon feeds to be treated at different operating conditions is in separate transfer-reaction zones depending from separate seal wells.

Suitable designs for a transfer-reaction zone also include vertical annular zones formed by enveloping a seal well structure according to this invention with one or more concentric shells of succeedingly larger diameters. In a case where two such shells are employed, the inner shell is preferably rigidly supported by a bottom portion of the lower vessel, and the outer shell is supported at its upper portion by a structure connected to the seal well in a manner such that the support structure also provides means for directing and distributing upflowing material in the inner portion of the annular reaction zone into the outer portion of the reaction zone and causing the material to flow thereafter in a downward direction. The flow of fluidized solids material from the well into the inner annular reaction zone is advantageously accomplished through distributing apertures or slots positioned in a lower portion of the well structure.

The above embodiment, which can include more than one such standpipe-seal well-annular reaction zone system, is particularly useful in large capacity apparatus designs, where the distances between shells bounding the annular portions of the reaction zone and the seal well are sufficiently large to permit periodic inspection of the system to detect possible failure due to high-velocity erosion without considerable dismantling of the apparatus. However, even if such failure occurred in the transfer-reactor wall adjacent to the seal well, the safety of the apparatus would never be in jeopardy, since the hydrocarbon vapors would merely be introduced into the seal well which is in open communication with the lower vessel but not with the regenerator.

For the purpose of insuring operational stability, it is preferred that the first portion of the transfer zone according to any one of the embodiment, i.e., the portion immediately subsequent to the seal well, is provided with means for introducing fluidizing gas thereto, in such quantities that a reverse seal consisting of a fluidized relatively dense bed of solids is maintained in this first portion of the transfer zone. The hydrocarbon feed is introduced through one or more inlets located at some distance downstream from said fluidizing gas inlets. In case of a temporary pressure upset during the operation of the apparatus, the aforementioned reverse seal will prohibit the passage of vaporizing hydrocarbons into the seal well which otherwise might necessitate the discontinuation of operations to reestablish the correct flow patterns.

At the aforementioned hydrocarbon feed inlets, there should be preferably located means for introducing a dispersing medium such as steam. These will also be in use during startup of the apparatus to aid in establishing catalyst circulation prior to introduction of hydrocarbon feed.

In a system comprised of one standpipe, one seal well and one transfer-reaction zone, the desired temperature of a transfer-reaction zone is maintained by providing it with a temperature controller which preferably is located near the outlet of the transfer-reactor, and which actuates the valve controlling the flow of hot regenerated catalyst through the corresponding standpipe. As the temperature drops below a desired level, the valve is opened to increase the amount of catalyst to be circulated and vice versa. In a system where one standpipe and one seal well serve more than one transfer-reaction zone, the temperature controller which actuates the catalyst flow valve is preferably located in the common disengaging zone in the lower vessel.

The outlet of the confined transfer zone or zones is located within the lower vessel and consequently is in open pressure communication with its corresponding open seal well. The location of said outlets can either be within an upper portion of a stripping zone, or at points adjacent thereto, in which latter cases the stripping zone is advantageously provided with solids inlet means e.g., in the form of slots in the stripping zone walls in the case of an internal stripper or with a solids control valve in the case of an external stripper. Generally, where the lower vessel contains a fluidized dense bed of solids, the outlet should be positioned above the dense bed to minimize overcracking of the hydrocarbons and to promote the rapid separation of the cracked vapors from the spent catalyst in the disengaging space provided by the vapor space of the lower vessel. It has been found that a further improvement in the separation is obtained by providing the outlet portion of the transfer zone with one or more side-discharge distributing apertures or slots as compared with a simple bottom outlet. Furthermore, it is possible by a suitable arrangement of such slots to guide the flow of separated solids in a desired direction and thereby aid in the distribution of such solids. The use of the discharge slots is not limited to disperse phase catalytic cracking zones, but applies generally to any system for transport of gas-solids suspensions and the subsequent separation, guidance and distribution of such solids.

The stripping zone can be of any suitable design and should include means for introducing stripping gas to a bottom portion thereof and preferably baffles to increase the contact between stripping gas and solids.

The apparatus should also include one or more riser conduits extending from a lower portion of the stripping zone into the upper vessel which serves as a regeneration zone, and said risers should be provided with inlets for lift gas to accomplish the upwards transport of solids through said risers.

The operation of the apparatus will be described with reference to one standpipe, one seal well enclosing said standpipe and one transfer-reaction zone. However, it is understood that there can be a plurality of standpipes, each having its corresponding seal well and one more transfer-reaction zones depending therefrom. Thus, hot freshly regenerated catalyst in amounts controlled by the temperature-actuated valve is transferred from the upper vessel serving as a regeneration zone through a standpipe into a corresponding seal well and is subsequently introduced into a confined transfer-reaction zone. The catalyst is preferably aerated to maintain it in a fluidized state while flowing through said standpipe. A dense fluidized bed of such regenerated catalyst is maintained in the seal well extending upwards into the annular space formed by the standpipe and the corresponding seal well structure. The height of the sealing bed is dependent on the pressure drop through the transfer-reaction zone and will fluctuate as the hydrocarbon feed rate, catalyst-to-oil ratio, temperature and pressure are varied. Being in a fluidized state, the sealing bed will act as a pressure-developing column and will provide precisely the necessary pressure for transport of the catalyst through the subsequent reaction zone and any subsequent dense-bed reaction zone which may be superimposed on the transfer-reaction zone.

Hydrocarbon feed, preferably preheated, is introduced to the transfer-zone where it is contacted with the hot regenerated catalyst flowing therethrough. The contact causes vaporization of the hydrocarbon feed and the formation of a dilute phase suspension of catalyst and oil vapors, which moves through the confined transfer-zone at high superficial velocities while cracking of the hydrocarbons is taking place. In a preferred embodiment, a dense fluidized bed of regenerated catalyst is maintained in the first portion of the transfer-zone upstream from the hydrocarbon feed inlet, said bed serving as a reverse pressure seal to prevent hydrocarbon vapors from entering the open seal well in the event of a pressure upset in the system.

The hydrocarbon feed can be fresh feed alone or a mixture of fresh feed and recycle gas oil, recovered from the subsequent product treatment zones. In the cases where more than one transfer-reaction zone is employed, dissimilar feeds which require different operating conditions for optimum results, can be treated separately in what is generally called segregated feed cracking, e.g., the fresh hydrocarbon feed and the recycle stream can be cracked in two separate zones. Examples of suitable feeds for treatment in the apparatus of the invention include gas oils, reduced crudes, waxy feeds, etc.

A suspension of cracked hydrocarbons and catalyst exits from the transfer-reaction zone and is advantageously withdrawn therefrom through one or more apertures or slots to promote rapid disengagement of spent catalyst. The spent catalyst exiting from the reaction zone is discharged above a dense fluidized bed of catalyst which is maintained in a bottom portion of the lower vessel. In one embodiment, said latter bed may serve as a true reaction zone by the additional introduction of a stream of hydrocarbons to said bed, and such an arrangement can be used with advantage for converting a hydrocarbon stream which is relatively hard to crack, e.g., a cycle oil which would require relatively longer times for its conversion into lower boiling material.

In another embodiment, no additional hydrocarbons are fed to the aforementioned dense bed, which in this case will serve as at least a first stripping zone. In one specific aspect, the spent catalyst is contacted in such bed with a sufficient quantity of a gaseous material, such as steam or nitrogen, to maintain the bed in a turbulent dense state of such dimensions that there is provided adequate time to strip off the vaporizable hydrocarbons from the catalyst particles. In another specific aspect, only such quantities of gaseous material is provided to the bed to assure the fluidized movement of particles therein. In this case, the bed performs very little stripping duties but serves mainly as a support much like a baffle to guide the disengaged and rapidly moving spent catalyst from the transfer-reaction zone into a separate and confined stripping zone located within said lower vessel.

The effluents from the stripping zone and from the reaction zone are preferably combined and subsequently separated from entrained catalyst particles by means of cyclones located in an upper portion of the lower vessel and are thereafter transferred to conventional product treatment zones including fractionation zones for recovery of normally gaseous hydrocarbon products, gasoline product and higher boiling fractions, which can include light and heavy fuel oil fractions and/or recycle gas oil fractions, the latter to be returned to the reaction zone or zones for further cracking.

The stripped catalyst is transported through one or more riser conduits into the upper vessel, where it is regenerated by burning the carbonaceous deposits on the catalyst in an oxygen-containing atmosphere. The transport and regeneration is carried out in any conventional manner and should preferably include use of at least part of the oxygen-containing regeneration gas for elevating the stripped catalyst to the regeneration zone.

The operating conditions employed to achieve catalytic cracking of hydrocarbons according to the invention include regenerator temperatures between about 1100° F. and about 1500° F. and regenerator dilute phase pressures from about atmospheric pressure to about 35 p.s.i.g. The density of the sealing bed in the seal well structure, is preferably maintained at values ranging from 20 lb./cu. ft. to about 45 lbs. cu. ft. The same range applies to preferred densities of the bed of regenerated catalyst maintained in the first portion of the transfer zone, which generates the reverse pressure seal. The outlet of the disperse phase reaction zone can be operated in a temperature range above 850° F. and preferably between about 925° F. and about 1000° F. Suitable reaction zone pressures are between about 5 p.s.i.g. and 50 p.s.i.g. The relative weights of catalyst and total hydrocarbons flowing through the elongated confined reaction zone, i.e., the so-called catalyst to oil ratio is preferably maintained at values ranging between about 2 and about 20. The length of the elongated reaction zone should be sufficient to provide contact times therein from about 0.5 second to about 4 seconds, while the cross-sectional area of said zone is designed to result in superficial velocities of the suspension ranging between about 15 ft./sec. and about 25 ft./sec. in the vicinity of the hydrocarbon feed inlet and between about 20 ft./sec. and about 60 ft./sec. at the reactor outlet. In those cases where additional hydrocarbon feed is introduced to the dense bed located in a bottom portion of the lower vessel, the conditions for this portion of the reaction include, in addition to the above-cited reaction temperatures and pressures, catalyst/oil ratios ranging between about 2 and about 25, preferably between about 5 and about 10, and space velocities, i.e., the hourly weight of hydrocarbons fed to the dense bed divided by the weight of said bed, ranging between about 0.25 and 15 and preferably from about 0.5 to about 5.

In the embodiments where no additional hydrocarbon feed is introduced to the bed maintained in the lower portion of the lower vessel, and where said bed functions mainly as means for directing the flow of spent catalyst into a main stripping zone, the superficial velocity of the fluidizing agent in said bed, such as steam or nitrogen, is preferably maintained in a range from about 0.04 ft./sec. to about 0.2 ft./sec.

The operating conditions employed in the stripping of spent catalyst in a stripping zone include temperatures in a range above about 825° F., and preferably between about 900° F. and about 975° F., and pressures ranging between about 10 p.s.i.g. and about 55 p.s.i.g. The amount of stripping medium relative to the catalyst circulation is advantageously maintained between about 1 and about 10 pounds per 1000 pounds of circulated catalyst. Superficial velocities of the stripping medium are from about 0.5 ft./sec. to about 2.0 ft./sec.

In order to provide a better understanding of the present invention, reference will be had to the accompanying drawings which form a part of this specification.

It is to be understood that the drawings are only shown in sufficient detail to fully understand the invention and that some portions of the system such as the fluidized dense bed regenerator as well as reaction effluent outlets and subsequent product recovery zone have not been included since those employed are conventional.

Figure 1:
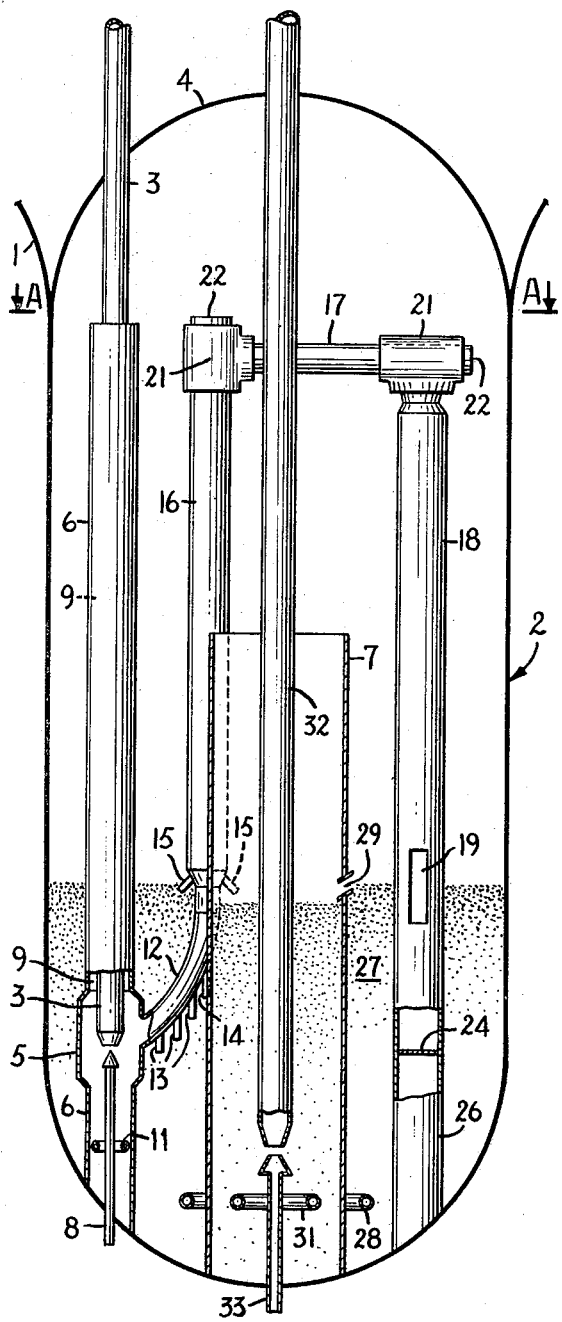
FIGURE 1 is an elevated view of a specific example of the apparatus of the invention, which includes two separate standpipe-open seal well-transfer conduit systems, only one of said systems being shown.
Figure 2:
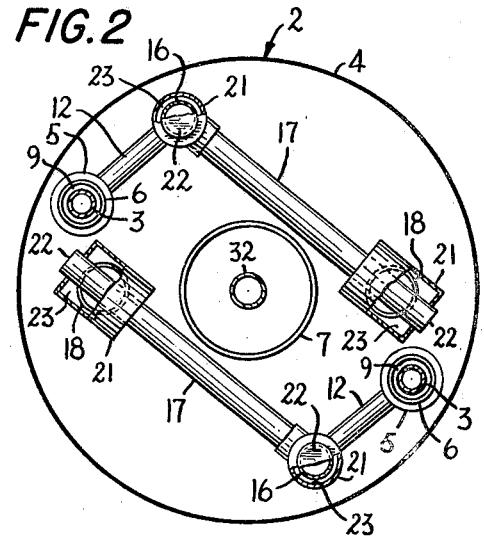
FIGURE 2 is a sectional view taken on line A—A of the FIGURE 1 looking downward.

The apparatus shown in FIGURES 1 and 2 is a "single-head" system comprising an upper vessel 1 containing a regeneration zone (only partially shown in FIGURE 1), which is superimposed on and vertically aligned with a lower vessel 2. Two vertical standpipes 3, which are supported by the partition 4, extend downwardly into open seal well structures, which are supported by the bottom of the lower vessel 2. The standpipes and their respective open seal wells are located 180° apart in the space provided between the central cylindrical stripping zone 7 and the walls of vessel 2. The steady flow of freshly regenerated catalyst through the standpipes, which is aided by the introduction of aeration gases throughout the heights of the standpipes (not shown on the drawing), is controlled by plug valves 8. The catalyst flows into open seal wells 6 where fluidized dense beds of such material are maintained and which extend upwards in the annular spaces 9. The fluidization of said beds is accomplished by the introduction of aeration steam through distributor rings 11. The catalyst flows from the open seal wells through first portions 12 of the transfer-reaction conduits, said first portions depending from the extended portion of the open seal well, shown by numeral 5, in an outward and upward direction. Aeration steam nozzles 13 are provided in the portions 12 to maintain therein fluidized dense bed reverse pressure seals. Steam nozzles 14 are provided for the injection of emergency steam in case of loss of hydrocarbon feed and for introduction of steam to maintain catalyst flow during startup and shutdown. Hydrocarbon feed is introduced by means of a series of injection nozzles 15, or alternatively by a single nozzle introducing the hydrocarbon vertically into riser conduit 16. The resulting dilute suspensions of vaporized hydrocarbons and catalyst flow through the vertical riser portions 16 of the transfer-reaction zones, into the crossover sections 17 and subsequently into vertical downcomer sections 18 provided with discharge slots 19. The respective riser-crossover and crossover-downcomer sections are connected by means of "side out" T's 21, which are provided with caps 22 at the far ends of their respective runs. All internal metal surfaces of these T devices and all connecting conduits thereto, are lined with an erosion resistant refractory. The "side out" T's are shielded by the secondary protective T-shaped structures 23, the annuli formed thereby being filled with erosion resistance refractory material, if desired. The downcomers are closed below the discharge slots by means of plates 24 and are supported in the example by extensions 26 attached to the bottom of vessel 2. However, other methods for closing and support of the transfer conduit can be employed. A barely fluidized dense bed 27 of catalyst is maintained in the bottom portion of the lower vessel 2 and fluidization is maintained by the introduction of steam through the aeration ring 28. The cracked vapor-catalyst suspensions which exit through the discharge slots are rapidly disengaged in the vapor space above bed 27 and the separated catalyst particles are guided along the surface of bed 27 into stripper inlet slots 29, where they are contacted with stripping steam provided through distribution rings 31. The stripped catalyst is transported to regeneration zone 1 by means of riser 32 with the lift gas being provided through hollow plug valve 33. The disengaged cracked vapors emanating from discharge slots 19 are combined with the vaporous stripper effluent from stripping zone 7 and subsequently passed to cyclones (not shown) for recovery of entrained catalyst therein. The vapors then exit from (not shown) the lower vessel and are passed to product recovery zones including fractionation zones (not shown).

Figure 3:
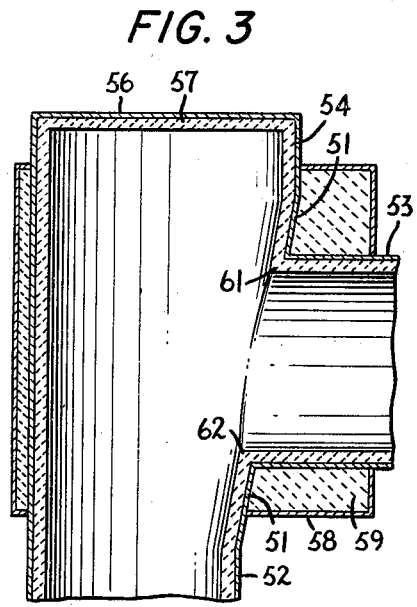
FIGURE 3 is a specific example of a device for changing the direction of flow of an erosive disperse phase suspension.

FIGURE 3 depicts an alternate device to a "side out" T employed for changing the direction of the flow of an erosive solids suspension, such as, for instance, the disperse phase hydrocarbon vapor-catalyst suspension in conduits 16, 17 and 18 of FIGURE 1. This device is described hereinafter with respect to its connection to a vertical riser conduit 52 and a horizontal crossover conduit 53; however, it can equally well be employed to connect a horizontal crossover with a subsequent vertical downcomer. The device is comprised essentially of a truncated oblique cone, which is connected at its lesser-diameter section to riser conduit 52 and at its oblique surface to the crossover section. A cylindrical extension 54 is provided at the larger diameter area of the cone which is capped by means of plate 56 or alternatively by other suitable closures such as a dished or ellipsoidal head. All internal metal surfaces of the cone device, as well as of all connecting conduits are lined with an erosion-resistant refractory material 57, serving as primary protection therefor. A secondary protection is obtained by the enclosure of the device within a cylindrical structure 58, which is filled with additional erosion-resistant refractory material 59. The high-velocity upflowing solids-suspension from riser 52 causes solids to be collected and held in relatively dense suspension within the portion of the device extending above crossover conduit 53, and said solids act as a further protection against erosion in this area as the high-velocity suspension impinges thereon. The advantage of the device of FIGURE 3 over the "side out" T's in FIGURE 2 lies primarily in the removal of sharp projections 61 and 62 from the direct line of travel of the high-velocity eroding suspension and thereby considerably reducing erosion at such projections.

Figure 4:
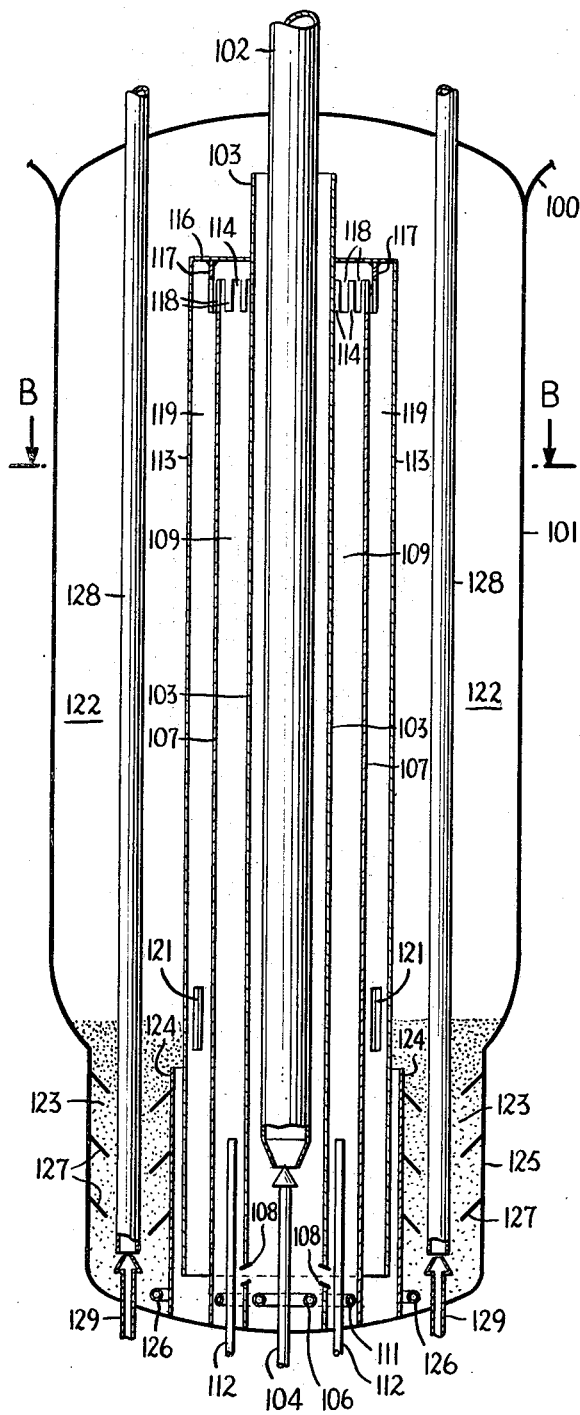
FIGURE 4 is an elevated view of another specific example of the apparatus of the invention including a single, centrally located standpipe-open seal well-transfer reaction conduit system.
Figure 5:
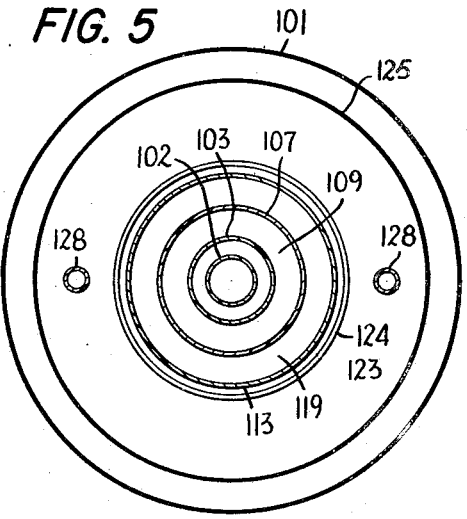
FIGURE 5 is a sectional view taken on line B—B of the FIGURE 4 looking downward.
Figure 6:
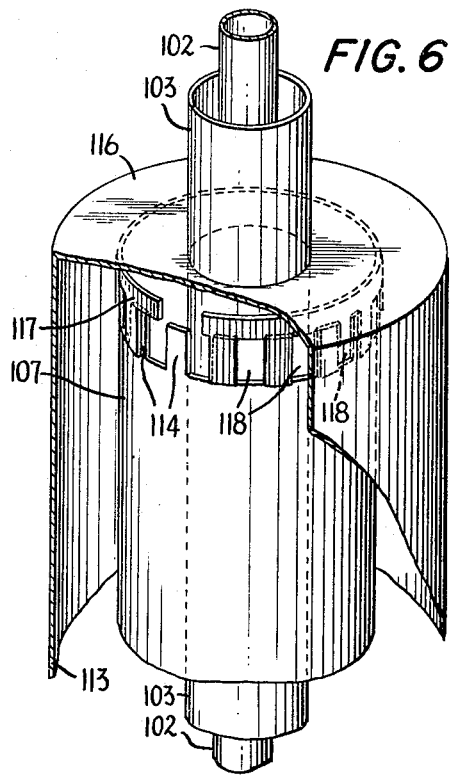
FIGURE 6 is a detail of the uppermost portion of the disperse phase transfer-reaction zone of FIGURE 4.

Referring now to FIGURES 4, 5 and 6 which depict another preferred embodiment of the apparatus of the invention, there is provided an upper vessel 100 (only partially shown) in vertical alignment with lower vessel 101, the bottom portion 125 of said vessel having a smaller diameter than the remaining vessel. The upper vessel, serving as the catalyst regeneration zone, may be directly superimposed on the lower vessel 2 in a "single-head" system or may equally well be completely separated therefrom in a "two-head" system. Hot freshly regenerated catalyst is withdrawn from the regeneration zone by means of vertical and centrally located standpipe 102, which is provided along its height with spaced aeration gas inlets (not shown) to maintain the regenerated catalyst in a fluidized state within the standpipe. The catalyst is discharged within the open seal well structure 103, which is supported by the bottom of the lower vessel, at a rate controlled by means of plug valve 104. Within the seal well and extending upwards into the annular space between the seal well structure and the standpipe, a dense fluidized bed of catalyst is maintained, a fluidizing gas such as steam or nitrogen being introduced by means of distributor ring 106. The open seal well is surrounded by a larger diameter concentric shell 107, which is supported by the bottom of vessel 101. Spaced around the periphery of the open seal well structure are several primary distributor slots 108 for the introduction of the hot regenerated catalyst into the annular inner circular space 109 between open seal well structure 103 and the shell 107. In a bottom portion of the latter annular space there is provided one or more aeration gas distributors 111 for the purpose of maintaining a reverse pressure seal of dense fluidized catalyst below the outlets of the hydrocarbon feed inlets 112. The contact of the hot catalyst with the hydrocarbon feed results in vaporization of the hydrocarbons and the formation of a high-velocity disperse phase suspension flowing upwards in the confined elongated transfer-reaction zone 109. The extreme upper portion of the shell 107 has the shape of a rectangular weir with protruding projections 114. Concentric with shell 107 there is provided another shell 113 of larger diameter which is capped by structure 116, which is fixedly supported by an upper portion of seal well structure 103. Attached to the underside of the cap structure is a circular lip 117 which extends downward and has the shape of an inverted rectangular weir. The diameter of the lip is somewhat larger than that of shell 107 to assure free movement of the latter due to expansion. The projections of the lip are of the same general shape, correspond to and overlap those of shell 107. In this manner secondary distributing slots 118 are formed, through which the suspension is introduced into the outer circular annular transfer-reaction zone 119, which is bounded by shells 113 and 107. It is to be understood that there are other suitable designs of distribution slots, e.g., coinciding apertures in the shell 107 and the lip 117. Advantageously, the top portion of the shell 113 may be flared, thereby providing an erosion protective device much like the capped far end of a "side out" T 22 in FIGURE 1 or the extended portion 54 closed by cap 56 in FIGURE 3. With further advantage, the inner annular portion of the cap structure can be extended upwards to provide additional protection. Secondary protective structures filled with erosion resistant refractory material may also be provided in this area which is subject to maximum erosion within the total transfer-reaction zone. The suspension flowing downwards in annulus 119 is discharged through tertiary distribution slots 121 spaced around the periphery of shell 113. The reactor system herein described thus includes three separate sets of distribution slots, 108, 118 and 121 which all function to assure even distribution of the reactants throughout the system, and the system will continue to function properly even if erosion occurs damaging secondary slots 118, said latter slots being most susceptible to erosion. Upon discharge the cracked vapors disengage rapidly in the vapor space 122 of the lower vessel 101 and the separated catalyst is introduced into annular stripping zone 123 bounded by the circular structure 124 and the lesser diameter wall of the lower vessel 101. Said annular stripping zone is provided with stripping gas such as steam or nitrogen by means of distributor ring 126. The zone is also provided with baffles 127. Stripped catalyst is transferred to the upper regeneration zone through vertical risers 128, the lift gas being supplied through hollow plug valves 129. The further treatment of the vaporous material including cracked hydrocarbon vapors from the reaction-transfer zone, stripper effluent and the various steam and/or nitrogen streams used as fluidization medium is carried out in the conventional manner described with reference to the apparatus of FIGURE 1.

The invention will be further illustrated by reference to the following example which shows the operating conditions suitable for use in the fluid catalytic cracking system described in FIGURES 1 and 2 adapted to process 20,300 barrels per day of heavy gas oil, e.g., a fresh feed having an API gravity of 21.1° at a throughput ratio of 1.51. The recycle stream was a heavy cycle oil having an API gravity of 15.6° and was mixed with the fresh feed prior to introduction to the transfer-reaction zone. Operations resulted in fresh feed conversion of 73 volume percent, and $C_5+$ gasoline yield of 53.8 volume percent (basis 430° F. TBP vapor temperature end point of total gasoline) and coke yield of 7.0 weight percent. A commercial molecular sieve type catalyst was employed.

TABLE 1

Regenerator

| | |
|---|---|
| Height (straight side), ft. | 36.6 |
| Inside diameter, ft. | 31.8 |
| Dense bed height, ft. | 10–15 |
| Catalyst density, lb./cu. ft. | 33 |
| Bed temperature, ° F. | 1220–1250 |
| Pressure above bed, p.s.i.g. | 16 |
| Combustion air (including lift air), lb./hr. | 205,000 |

Standpipes

| | |
|---|---|
| Height, ft. | 59 |
| Inside diameter, inches | 20 |
| Catalyst density, lb./cu. ft. | 37 |

Open seal wells

| | |
|---|---|
| Height, ft. | 32.3 |
| Clearance in seal well annulus, inches | 5 |
| Catalyst density, lb./cu. ft. | 35 |
| Pressure head, p.s.i. | 6.2 |
| Fluidizing gas, lb./hr. | 300 |

Transfer-reaction zones

| | |
|---|---|
| (A) Reverse pressure seals: | |
|   Height, ft. | 8.1 |
|   Inside diameter, inches | 21 |
|   Slope of dense phase transfer line (away from vertical), degrees | 35 |
|   Catalyst density, lb./cu. ft. | 36 |
|   Pressure head, p.s.i. | 2.1 |
|   Fluidizing gas, lb./hr. | 700 |
| (B) Risers: | |
|   Height, ft. | 22.2 |
|   Inside diameter, inches | 25 |
|   Catalyst-to-oil ratio | 8 |
|   Superficial velocity of total vapors at hydrocarbon inlet, ft./sec. | 23 |
| (C) Crossovers: | |
|   Length, ft. | 7 |
|   Inside diameter, inches | 25 |
| (D) Downcomers: | |
|   Height, ft. | 23.9 |
|   Inside diameter, inches | 31 |
|   Superficial velocity of total vapors before slots, ft./sec. | 30 |
|   Pressure drop across slots, p.s.i. | 0.5 |
|   Outlet temperature, ° F. | 980–990 |
|   Pressure drop from hydrocarbon inlet through slots, p.s.i. | 4.1 |

Lower vessel

| | |
|---|---|
| Height (straight side), ft. | 34 |
| Inside diameter, ft. | 19.3 |
| Catalyst bed height, ft. | 13.5 |
| Superficial velocity of fluidizing gas, ft./sec. | 0.1 |
| Catalyst density, lb./cu. ft. | 38 |
| Pressure in vapor space, p.s.i.g. | 21 |
| Temperature in vapor space, °F. | 950–960 |

Stripper

| | |
|---|---|
| Height (straight side), ft. | 28 |
| Inside diameter, ft. | 10.3 |
| Catalyst bed height, ft. | 13.5 |
| Catalyst density, lb./cu. ft. | 34 |
| Steam rate, lb./hr. | 9,900 |
| Catalyst holdup, tons | 18.5 |
| Exit temperature, °F. | 925 |

Stripped catalyst riser

| | |
|---|---|
| Height, ft. | 65 |
| Inside diameter, inches | 34 |
| Lift air rate, lb./hr. | 55,000 |

It will be obvious to those skilled in the art that many modifications may be made within the scope of the present invention without departing from the spirit thereof, and the invention includes all such modifications.

What is claimed is:

1. An apparatus for the conversion of hydrocarbons which comprises:
   an upper vessel;
   a lower vessel;
   at least one structure forming an open seal well within said lower vessel;
   at least one standpipe in communication with the upper vessel and the open seal well;
   valve means for controlling flow of solid material through said standpipe into said seal well;
   at least one confined elongated transfer zone within said lower vessel in open pressure communication with and depending from each of said seal wells;
   means for introducing hydrocarbon feed into the confined elongated transfer zone;
   a solids stripping zone;
   means for introducing solids from the transfer zone into said stripping zone, and
   means for tranferring solids from the solids stripping zone to the upper vessel.

2. An apparatus according to claim 1 wherein a bottom portion of said well is provided with fluidizing gas inlet means.

3. An apparatus according to claim 1 wherein means are provided to maintain a reverse pressure seal in a first portion of said elongated transfer zone and wherein the hydrocarbon inlet means are located downstream from said reverse pressure seal.

4. An apparatus according to claim 1 wherein said valve means is a temperature actuated plug valve located at the outlet from the standpipe and responsive to temperature fluctuations within the transfer zone.

5. An apparatus according to claim 1 wherein fluidizing medium inlet means are provided in a bottom portion of said lower vessel.

6. An apparatus according to claim 1 wherein a portion of said transfer zone is comprised of an apertured conduit.

7. An apparatus according to claim 1 wherein a last portion of said transfer zone comprises an apertured conduit.

8. An apparatus according to claim 3 wherein means are provided for introducing fluidizing gas to said first portion.

9. An apparatus according to claim 7 wherein the stripping zone is located within the lower vessel adjacent to said last portion of the transfer zone.

10. An apparatus for the conversion of hydrocarbons which comprises:
    an upper vessel;
    a lower vessel disposed in vertical alignment with said upper vessel;
    a structure forming an open seal well within said lower vessel and rigidly supported by a bottom portion of said lower vessel;
    a suspended vertical standpipe in communication with the upper and lower vessels and extending downwardly into the open seal well;
    a plug valve located at the outlet from the vertical standpipe for control of flow of solids therethrough;
    a first means for introducing a fluidizing medium into a bottom portion of said well;
    a confined elongated transfer zone within said lower vessel in open pressure communication with and rigidly connected at one of its extremes to said seal well and a first portion of said transfer zone depending from said open seal well in an outward and upward direction;
    a second means for introducing a fluidizing medium into said first portion of the transfer zone;
    at least one hydrocarbon feed inlet to said transfer zone located downstream from the second fluidizing medium inlet means;
    a solids stripping zone;
    means for introducing solids from the transfer zone into the stripping zone, and
    at least one riser conduit for the transfer of solids from the stripping zone to the upper vessel.

11. An apparatus according to claim 10 wherein the transfer conduit is comprised of the following additional portions:
    a second substantially vertical riser portion;
    a first device to rapidly change the direction of flow of material exiting the second portion;
    a third and substantially horizontal crossover portion;
    a second device to rapidly change the direction of flow of material exiting the third portion; and
    a fourth and substantially vertical downcomer portion.

12. An apparatus according to claim 11 wherein said devices are spatially enclosed within a protective structure.

13. An apparatus according to claim 12 wherein the space between said devices and said protective structure is filled with an erosion-resistant refractory material.

14. An apparatus for the conversion of hydrocarbons which comprises:
    an upper vessel;
    a lower vessel disposed in vertical alignment with said upper vessel;
    a first shell forming an open seal well located within said lower vessel and said shell being rigidly supported by a bottom portion of said lower vessel;
    a suspended vertical standpipe in communication with the upper and lower vessels and extending downwardly into said open seal well;
    a plug valve located at the outlet from the vertical standpipe to control flow of solids therethrough;
    a first means for introducing fluidizing medium into a bottom portion of said well;
    a second shell having a larger cross-sectional area in concentric relationship to said first shell to provide between said first and second shells a first annular portion of a transfer zone;
    means for providing communication between said seal well and a lower portion of said first annular transfer zone portion;
    a second means for introducing fluidizing medium in a bottom portion of said first transfer zone portion;
    at least one hydrocarbon feed inlet in said first transfer zone portion located above said second means for introducing fluidizing medium;
    a third shell having a still larger cross-sectional area in concentric relationship to said second shell to provide between said third and second shells a second annular portion of a transfer zone;

means for providing communication between the upper sections of said first and second annular portions of the transfer zone;

support means connecting the third shell at an upper section thereof to said first shell;

a solids stripping zone in a bottom annular portion of said lower vessel;

means for introducing solids from the transfer zone into the stripping zone, and at least one vertical riser conduit for the transfer of solids from the stripping zone to the upper vessel.

15. An apparatus according to claim 14 wherein the support means for connection of the third shell to the first shell and the means for providing communication between the first and second annular portions of the transfer zone are comprised of:

an annular cap rigidly connected at its outer periphery to the third shell and at its inner periphery to the first shell;

a weir extending from the upper portion of the second shell, the weir having a first set of rectangular projections;

an inverted weir having a second set of rectangular projections, said inverted weir being attached to the underside of said cap in a downward direction and the second set of rectangular projections overlapping the first set of such projections to provide apertures therebetween.

16. An apparatus according to claim 14 wherein the upper portion of the third shell is flared.

17. An apparatus according to claim 14 wherein a protective structure spatially encloses an outer and upper portion of the third shell.

18. An apparatus according to claim 17 wherein the space between said outer and upper portion of the third shell and said protective structure is filled with an erosion-resistant refractory material.

19. A method for the conversion of hydrocarbons comprising:

transferring hot, freshly regenerated catalyst of fluidizable particle size from an upper regeneration zone through at least one standpipe to at least one open seal well which is located within the confines of a lower vessel;

maintaining said open seal well in open pressure communication with the outlet of at least one confined elongated transfer zone depending therefrom;

maintaining a sealing and pressure-developing dense bed of fluidized regenerated catalyst in said open seal well;

employing the thus developed pressure for transferring catalyst from said open seal well through said depending confined elongated transfer zone;

concurrently contacting in said transfer zone said catalyst with hydrocarbon feed under conditions suitable for cracking of said hydrocarbon feed;

withdrawing cracked hydrocarbons and spent catalyst from the outlet portion of the transfer zone;

transferring said spent catalyst to the inlet of a stripping zone;

stripping spent catalyst of strippable hydrocarbons;

transferring cracked and strippable hydrocarbons to a product recovery zone;

transferring stripped catalyst to the upper regeneration zone, and regenerating stripped catalyst by contact with an oxygen-containing gas at temperatures above those employed in the transfer zone.

20. A method according to claim 19 wherein a reverse pressure seal comprised of a second dense fluidized bed of regenerated catalyst is maintained in a first portion of the elongated confined transfer zone immediately subsequent to the open seal well.

21. A method according to claim 19 wherein two transfer zones are employed and wherein dissimilar hydrocarbon feeds are contacted with catalyst in the respective transfer zones.

22. A method according to claim 19 wherein a dense fluidized bed of catalyst is maintained in a bottom portion of the lower vessel.

23. A method according to claim 19 wherein the cracked hydrocarbons and spent catalyst are withdrawn through discharge slots provided in said outlet portion.

24. A method according to claim 22 wherein a second hydrocarbon feed is introduced to said dense fluidized bed within the bottom portion of the lower vessel under conditions suitable for cracking of said second hydrocarbon feed.

25. A method for the conversion of hydrocarbons comprising:

maintaining an upper regeneration zone in vertical alignment with a lower vessel;

transferring hot, freshly regenerated catalyst of fluidizable particle size from the upper regeneration zone through a vertical suspended standpipe extending from said upper regeneration zone into an open seal well which is located within the confines of the lower vessel;

maintaining said open seal well in open pressure communication with the outlet of a confined elongated transfer zone depending therefrom;

controlling the flow of said catalyst by means of a plug valve located at the outlet from said standpipe;

maintaining a sealing and pressure-developing dense bed of fluidized regenerated catalyst in said open seal well;

employing the thus developed pressure for transferring catalyst from said open seal well through said depending confined elongated transfer zone, a first portion of said transfer zone depending from said well in an upward and outward direction;

maintaining a reverse pressure seal comprised of a fluidized dense bed of catalyst in said first portion of the transfer zone;

concurrently contacting hydrocarbon feed with catalyst in subsequent portions of the transfer zone under conditions suitable for cracking of said hydrocarbon feed;

withdrawing cracked hydrocarbons and spent catalyst from a last and substantially vertical downcomer portion of the transfer zone;

directing spent catalyst into a stripping zone located adjacent to said downcomer within said lower vessel;

stripping spent catalyst of strippable hydrocarbons in said stripping zone;

transferring cracked and strippable hydrocarbons to a product recovery zone;

transferring stripped catalyst to the upper regeneration vessel and regenerating stripped catalyst by contact with an oxygen-containing gas at temperatures above those employed in the transfer zone.

26. A method according to claim 25, wherein directing of spent catalyst into the stripping zone is accomplished by maintaining a dense bed of fluidized catalyst in a bottom portion of said lower vessel, introducing a fluidizing gas to a bottom portion of said bed at superficial velocities ranging from about 0.04 ft./sec. to about 0.2 ft./sec. and maintaining a sufficient height of said bed to provide for the substantially horizontal transfer of spent catalyst from the discharge slots into the stripping zone.

27. A method according to claim 25 wherein catalyst and hydrocarbon feed are contacted in subsequent portions of the transfer zone comprised of a second substantially vertical riser portion, a third substantially horizontal crossover portion and a fourth and last substantially vertical downcomer portion.

28. A method for the conversion of hydrocarbons comprising:
maintaining an upper regeneration zone in vertical alignment with a lower vessel;
transferring hot, freshly regenerated catalyst of fluidizable particle size from the upper regeneration zone through a vertical suspended standpipe extending from said upper regeneration zone into said open seal well which is located within the confines of a lower vessel;
maintaining said open seal well in open pressure communication with the outlet of a confined elongated transfer zone depending therefrom;
controlling the flow of said catalyst by means of a plug valve located at the outlet from said standpipe;
maintaining a sealing and pressure-developing dense bed of fluidized regenerated catalyst in said open seal well;
employing the thus developed pressure for transferring catalyst from said open seal well through a confined elongated transfer zone depending from said open seal well;
maintaining a first annular portion of said transfer zone in concentric relationship to the seal well;
maintaining a second annular portion of said transfer zone in concentric relationship to the first annular portion;
maintaining a reverse pressure seal comprised of a fluidized dense bed of catalyst in a bottom section of said first annular portion;
concurrently contacting hydrocarbon feed with catalyst in subsequent sections of said first and second annular portions under conditions suitable for cracking of said hydrocarbon feed;
withdrawing cracked hydrocarbons and spent catalyst from the outlet section of the second annular portion of the transfer zone;
directing spent catalyst to the inlet of a stripping zone;
stripping spent catalyst of strippable hydrocarbons;
transferring cracked and strippable hydrocarbons to a product recovery zone;
transferring stripped catalyst to the upper regeneration zone, and
regenerating stripped catalyst by contact with an oxygen-containing gas at temperatures above those employed in the transfer zone.

29. A method according to claim 28 wherein the stripping is performed in a stripping zone maintained in a bottom annular portion of the lower vessel.

References Cited

UNITED STATES PATENTS

| | | | |
|---|---|---|---|
| 2,428,873 | 10/1947 | Gunness et al. | 208—164 |
| 2,900,324 | 8/1959 | Patton et al. | 208—164 |
| 2,900,329 | 8/1959 | Osbourne et al. | 208—164 |
| 2,965,454 | 12/1960 | Harber | 208—164 |
| 3,152,064 | 10/1964 | Osbourne | 208—164 |
| 3,378,483 | 4/1968 | Worrell et al. | 208—164 |
| 3,412,013 | 11/1968 | Bowles | 208—164 |

HERBERT LEVINE, Primary Examiner

U.S. Cl. X.R.

23—288; 208—153, 155